Patented Apr. 8, 1952

2,591,877

UNITED STATES PATENT OFFICE 2,591,877

PURIFICATION OF ALCOHOLS BY AZEOTROPIC DISTILLATION

Nat C. Robertson and Robert H. Buchanan, Corpus Christi, Tex., assignors to Celanese Corporation of America, a corporation of Delaware No Drawing. Application September 21, 1948, Serial No. 50,446

3 Claims. (Cl. 202—42)

This invention relates to the production of purified organic compounds, and relates more particularly to the separation and purification of certain mixture of organic compounds obtained when isolating the products of the vapor phase partial oxidation, with air or oxygen, of gaseous hydrocarbons, such as propane, butane, or mixtures thereof.

An object of this invention is the provision of an efficient and economical process for the separation of purified n-propanol, isobutanol and n-butanol from a crude fraction containing a mixture of said compounds together with various acetals, carbonyl compounds and oxides as impurities.

Other objects of this invention will appear from the following detailed description.

The vapor phase, partial oxidation of aliphatic hydrocarbons such as propane or butane, or mixtures thereof, employing air or oxygen as the oxidizing agent, yields a complex mixture of products including formaldehyde, acetaldehyde, methanol, propionaldehyde, allyl alcohol, n-propanol, isobutanol, secondary butanol, n-butanol, acetone, methyl ethyl ketone, methylal, acrolein, tetrahydrofuran, methyl formate and other esters, formals, acetals and various oxides, as well as numerous other aliphatic compounds in varying amounts. In order to separate the complex mixture of oxidation products and to purify each of the components so that the same will be suitable for commercial use, an intricate product purification scheme is necessary. The purification involves a series of fractional distillation operations yielding a number of crude fractions each containing a plurality of compounds. One such fraction which is obtained during the process comprises a mixture of n-propanol, isobutanol, secondary butanol, and n-butanol containing various acetals, esters, carbonyl compounds and oxides. The separation of the alcohols from the other components is complicated by the fact that they all have boiling points which are relatively close to one another and a straight fractional distillation does not effect a satisfactory separation.

We have now found that the alcohols present in a mixture comprising n-propanol, isobutanol, secondary butanol, n-butanol, esters, acetals, carbonyl compounds and oxides may be separated from the other components in an efficient and economical manner if said mixture is fractionated to separate a crude fraction therefrom containing the alcohols normally boiling below about 100° C. and a crude fraction containing the alcohols normally boiling above about 100° C., and each fraction then subjected to an azeotropic distillation employing as the entraining agent an alkyl-cyclohexane, such as methyl-cyclohexane. The azeotropic distillates obtained each comprise a mixture of methyl-cyclohexane and the alcohols originally present in each of said crude fractions while the residue which is drawn from the reboiler of the fractionating towers in which the azeotropic distillations take place comprises the esters, acetals, carbonyl compounds and oxides originally present in the starting mixture. Preferably, the initial fractionation of the crude mixture is so effected that the fractions separated comprise one boiling at from about 96 to 103° C. and the other at from about 103 to 120° C.

The alcohols in the methyl-cyclohexane-alcohol azeotropes obtained may be separated by combining the azeotropes and subjecting the combined azeotropes to a further distillation in a methyl-cyclohexane recovery column employing methanol as the entraining agent. The methanol removes the methyl-cyclohexane as a methyl cyclohexane-menthanol azeotrope and the mixture of alcohols which remains may then be separated by ordinary fractionation methods into the individual alcohols present therein. If desired, the alcohols in the methyl-cyclohexane-alcohol azeotropes may be recovered by distilling the azeotropes separately rather than combining them.

The methyl-cyclohexane-menthanol azeotrope may be separated and the methyl-cyclohexane and methanol recycled in the process by extracting the methyl-cyclohexane-methanol azeotrope with water. The methyl-cyclohexane separates in the extractor as a water-immiscible layer and is recycled to effect a further separation of alcohols from the acetal, carbonyl and oxide impurities. The methanol is stripped from the water extract by distillation and the water is recycled to the water extractor. The methanol thus separated is recycled to the methyl-cyclohexane recovery column where the methyl-cyclohexane is recovered as the methyl-cyclohexane-methanol azeotrope previously mentioned, and a mixture of n-propanol, isobutanol, secondary butanol and n-butanol is recovered as the residue from the reboiler of said methyl-cyclohexane recovery column. Fractional distillation of this latter mixture of alcohols allows the separation of n-propanol and secondary butanol as the initial distillate and the mixture of isobutanol and n-butanol remaining is then separated by a second fractionation, the isobutanol comprising the distillate and the n-butanol the column residue.

Our novel method of separating the undesirable impurities from the crude fraction of alcohols employing an alkyl cyclohexane, such as methyl-cyclohexane, as the entraining agent may thus be carried out in a continuous fashion and offers an efficient and economical means for the purification of said alcohols and the removal therefrom of contaminants.

It is to be understood that the foregoing detailed description is given merely by way of illustration and that many variations may be made therein without departing from the spirit of our invention.

Having described our invention, what we desire to secure by Letters Patent is:

1. In a process for the removal of acetals, carbonyl compounds and oxides from a mixture comprising essentially n-propanol, isobutanol, secondary butanol and n-butanol wherein said esters, acetals, carbonyl compounds, and oxides are present as impurities, the step which comprises fractionating the mixture to separate from the same a crude fraction boiling at from about 96 to 103° C. and a crude fraction boiling at from about 103 to 120° C. and then subjecting each of said fractions to azeotropic distillation employing methyl-cyclohexane as the alcohol entraining agent, whereby the said alcohols are removed from said fractions.

2. Process for the treatment of a mixture comprising essentially n-propanol, isobutanol, secondary butanol and n-butanol containing esters, acetals, carbonyl compounds and oxides as impurities whereby said impurities are removed, which comprises fractionating the mixture to separate from the same a crude fraction boiling at from about 96 to 103° C. and a crude fraction boiling at from about 103 to 120° C., subjecting each of said fractions to azeotropic distillation employing methyl-cyclohexane as the alcohol entraining agent, and separating said alcohols from the azeotropic distillates obtained by azeotroping said distillates with methanol whereby the methyl-cyclohexane is separated therefrom as a methyl-cyclohexane-methanol azeotrope.

3. Process for the treatment of a mixture comprising essentially n-propanol, isobutanol, secondary butanol and n-butanol containing esters, acetals, carbonyl compounds and oxides as impurities whereby said impurities are removed, which comprises fractionating the mixture to separate from the same a crude fraction boiling at from 96 to 103° C. and a crude fraction boiling at from about 103 to 120° C., subjecting each of said fractions to azeotropic distillation employing methyl-cyclohexane as the alcohol entraining agent, combining the azeotropic distillates and separating said alcohols from the combined azeotropic distillates by azeotroping said distillates with methanol whereby the methyl-cyclohexane is separated therefrom as a methyl-cyclohexane-methanol azeotrope.

NAT C. ROBERTSON.
ROBERT H. BUCHANAN

REFERENCES CITED

The following references are of record in the file of this patent:

UNITED STATES PATENTS

| Number | Name | Date |
| --- | --- | --- |
| 2,341,433 | Fisher | Feb. 8, 1944 |
| 2,351,527 | Lambecke | June 13, 1944 |
| 2,376,870 | Engel | May 29, 1945 |
| 2,386,058 | Patterson et al. | Oct. 2, 1945 |
| 2,476,205 | McCants | July 12, 1949 |
| 2,476,206 | McCants | July 12, 1949 |

OTHER REFERENCES

Mair et al.: "Separation of Hydrocarbons by Azeotropic Distillations," Journal of Research of the National Bureau of Standards, vol 27, pp. 39-63 (pages 44-49 relied on), July 1941.

Horsely: "Table of Azeotropes and Non-Azeotropes," Analytical Chemistry, vol. 19,pages 519, 549, 550, 551. August 1947.